United States Patent
Quan

(10) Patent No.: US 8,135,237 B2
(45) Date of Patent: Mar. 13, 2012

(54) APPARATUSES AND METHODS FOR NOISE REDUCTION

(75) Inventor: Shuxue Quan, San Diego, CA (US)

(73) Assignee: Aptina Imaging Corporation, George Town (KY)

( * ) Notice: Subject to any disclaimer, the term of this patent is extended or adjusted under 35 U.S.C. 154(b) by 1053 days.

(21) Appl. No.: 12/071,681

(22) Filed: Feb. 25, 2008

(65) Prior Publication Data

US 2009/0214129 A1  Aug. 27, 2009

(51) Int. Cl.
*G06K 9/32* (2006.01)

(52) U.S. Cl. .......... 382/300; 382/299; 348/538; 396/54; 396/96

(58) Field of Classification Search .................. 382/300, 382/299; 348/538; 396/54, 96
See application file for complete search history.

(56) References Cited

U.S. PATENT DOCUMENTS

| | | | |
|---|---|---|---|
| 5,475,769 A * | 12/1995 | Wober et al. | 382/167 |
| 6,724,945 B1 * | 4/2004 | Yen et al. | 382/274 |
| 6,757,442 B1 | 6/2004 | Avinash | |
| 6,813,389 B1 | 11/2004 | Gindele et al. | |
| 6,816,197 B2 * | 11/2004 | Keshet et al. | 348/273 |
| 6,836,289 B2 * | 12/2004 | Koshiba et al. | 348/273 |
| 6,868,190 B1 | 3/2005 | Morton | |
| 6,970,597 B1 * | 11/2005 | Olding et al. | 382/167 |
| 7,030,917 B2 * | 4/2006 | Taubman | 348/273 |
| 7,129,976 B2 | 10/2006 | Jaspers | |
| 7,199,348 B2 | 4/2007 | Olsen et al. | |
| 7,206,101 B2 | 4/2007 | Avinash | |
| 7,366,347 B2 * | 4/2008 | Song et al. | 382/162 |
| 7,369,165 B2 * | 5/2008 | Bosco et al. | 348/272 |
| 7,373,013 B2 * | 5/2008 | Anderson | 382/261 |
| 7,391,904 B2 * | 6/2008 | Embler | 382/167 |
| 7,580,589 B2 * | 8/2009 | Bosco et al. | 382/275 |
| 7,701,496 B2 * | 4/2010 | Hains et al. | 348/273 |
| 2002/0167602 A1 * | 11/2002 | Nguyen | 348/280 |
| 2002/0186309 A1 * | 12/2002 | Keshet et al. | 348/272 |
| 2003/0052981 A1 * | 3/2003 | Kakarala et al. | 348/272 |
| 2004/0085458 A1 * | 5/2004 | Yanof et al. | 348/223.1 |
| 2004/0085475 A1 * | 5/2004 | Skow et al. | 348/362 |
| 2005/0134713 A1 * | 6/2005 | Keshet et al. | 348/273 |
| 2006/0222269 A1 * | 10/2006 | Ohno | 382/300 |
| 2007/0153335 A1 * | 7/2007 | Hosaka | 358/463 |
| 2008/0075394 A1 * | 3/2008 | Huang et al. | 382/300 |

FOREIGN PATENT DOCUMENTS

WO  WO 2006/112814 A1  10/2006

OTHER PUBLICATIONS

An efficient—steps, Plataniotis et al., IEEE, 0-7803-8484-9, 2004, pp. III-469 to III-472.*
Angelo Bosco, et al., "A Temporal Noise Reduction Filter Based on Image Sensor Full-Frame Date", Advanced System Technology Catania Lab—STMicroelectronics Imaging Division, Edinburgh—STMicroelectronics, 2003 IEEE, pp. 402-403.
Henrik Malm, et al., "Adaptive enhancement and noise reduction in very low light-level video," 2007 IEEE.
New product: "Image processing ICs present sharp images at low Power", Global Sources, EE Times Asia, posted May 23, 2007, http://www.eetasia.com/ART_8800465576_1034362_NP_c56ccd54.HTM.

* cited by examiner

*Primary Examiner* — Jayesh A Patel

(57) ABSTRACT

Methods and apparatuses provide noise reduction in a demosaiced digital image by processing the digitized signals received from a color pattern pixel array for noise reduction previous to, or as part of, a demosaicing process by using a weight matrix.

3 Claims, 13 Drawing Sheets

$$\begin{bmatrix}
½ & ½ & 0 & 0 & 0 & 0 & 0 & 0 & 0 & 0 \\
½ & 1 & 0 & 0 & 0 & 0 & 0 & 0 & 0 & 0 \\
1 & 1 & 1 & 0 & 0 & 0 & 0 & 0 & 0 & 0 \\
1 & 1 & 1 & 1 & 0 & 0 & 0 & 0 & 0 & 0 \\
1 & 1 & 1 & 1 & 1 & 0 & 0 & 0 & 0 & 2 \\
1 & 1 & 1 & 1 & 1 & 2 & 0 & 0 & 0 & 2 \\
1 & 1 & 1 & 1 & 2 & 2 & 2 & 0 & 0 & 2 \\
1 & 1 & 1 & 2 & 2 & 2 & 2 & 4 & 0 & 2 \\
1 & 1 & 2 & 2 & 2 & 2 & 4 & 4 & 8 & 0
\end{bmatrix}$$

| 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|
| 1 | 1 | 0 | 0 | 0 | 0 | 0 | 0 | 0 | 0 | 0 | 0 | 0 | 0 | 0 | 0 | 0 | 0 |
| 1 | 1 | 1 | 0 | 0 | 0 | 0 | 0 | 0 | 0 | 0 | 0 | 0 | 0 | 0 | 0 | 0 | 0 |
| 1 | 1 | 1 | 1 | 0 | 0 | 0 | 0 | 0 | 0 | 0 | 0 | 0 | 0 | 0 | 0 | 0 | 0 |
| 1 | 1 | 1 | 1 | 1 | 0 | 0 | 0 | 0 | 0 | 0 | 0 | 0 | 0 | 0 | 0 | 0 | 0 |
| 1 | 1 | 1 | 1 | 1 | 1 | 0 | 0 | 0 | 0 | 0 | 0 | 0 | 0 | 0 | 0 | 0 | 0 |
| 1 | 1 | 1 | 1 | 1 | 1 | 1 | 0 | 0 | 0 | 0 | 0 | 0 | 0 | 0 | 0 | 0 | 0 |
| 1 | 1 | 1 | 1 | 1 | 1 | 1 | 1 | 0 | 0 | 0 | 0 | 0 | 0 | 0 | 0 | 0 | 0 |
| 1 | 1 | 1 | 1 | 1 | 1 | 1 | 1 | 0 | 0 | 0 | 0 | 0 | 0 | 0 | 0 | 0 | 0 |
| 1 | 1 | 1 | 1 | 1 | 1 | 1 | 1 | 2 | 0 | 0 | 0 | 0 | 0 | 0 | 0 | 0 | 0 |
| 1 | 1 | 1 | 1 | 1 | 1 | 1 | 1 | 2 | 2 | 2 | 0 | 0 | 0 | 0 | 0 | 0 | 0 |
| 1 | 1 | 1 | 1 | 1 | 1 | 1 | 1 | 2 | 2 | 2 | 2 | 0 | 0 | 0 | 0 | 0 | 0 |
| 1 | 1 | 1 | 1 | 1 | 1 | 1 | 2 | 2 | 2 | 2 | 2 | 2 | 0 | 0 | 0 | 0 | 4 |
| 1 | 1 | 1 | 1 | 1 | 1 | 2 | 2 | 2 | 2 | 2 | 2 | 2 | 4 | 0 | 0 | 0 | 4 |
| 1 | 1 | 1 | 1 | 1 | 2 | 2 | 2 | 2 | 2 | 2 | 2 | 2 | 4 | 4 | 4 | 0 | 4 |
| 1 | 1 | 1 | 2 | 2 | 2 | 2 | 2 | 2 | 2 | 2 | 4 | 4 | 4 | 4 | 8 | 0 | 4 |
| 1 | 1 | 2 | 2 | 2 | 2 | 2 | 2 | 2 | 2 | 4 | 4 | 4 | 4 | 8 | 8 | 16 | 0 |

APPARATUSES AND METHODS FOR NOISE REDUCTION

FIELD OF THE INVENTION

Embodiments of the invention are directed to methods and apparatuses of noise reduction in digital images.

BACKGROUND OF THE INVENTION

Digital images are now widely available for various types of imager devices that may use CCD, CMOS or other types of pixel arrays and associated readout circuits. Most digital images are constructed from the analog signals output from the pixel array, typically, though not exclusively, output as Bayer pattern analog signals. The analog pixel signals, each of which represents one color, e.g., red, green or blue, are converted to digital signals that are processed to produce demosaiced pixel signals forming a digital image, which may be stored, transmitted, and/or further processed.

Noise is an image distorting feature that may be present in a stored, transmitted or processed digital image and may come from different sources. For example, there may be light noise produced by the pixel array and associated readout circuitry, such noise is intensified by continued decreases in pixel size, and under low light conditions. In addition, quantization errors may occur in the analog-to-digital converter that digitizes the signals. Noise may also be introduced by a recording medium that stores the digital image or by a transmission medium.

As a consequence, digital image denoising has become an important part of digital image processing. In many instances, digital images are processed for noise content in the later stages of digital image processing after a demosaicing operation on the original pixel array signals. In such cases, noise present in the initial digitized image may be further intensified by early stage digital processing and as a result may become more difficult to remove, requiring a higher degree of noise processing, which may excessively distort or blur the digital image. In addition, performing a denoising operation after demosaicing requires a large line buffer memory, which increases the size of a chip containing an image processor.

What is desired, then, is a method and apparatus for denoising prior to or during demosaicing.

BRIEF DESCRIPTION OF THE DRAWINGS

FIG. 4 is a matrix according to an embodiment described herein.

FIG. 8 is a matrix according to an embodiment described herein.

DETAILED DESCRIPTION OF THE INVENTION

Embodiments described herein process the digitized pixel signals moving from the pixel array to an image processor at an early stage in the digitized processing chain to remove noise, which reduces the amount of noise present in the constructed digital image.

In first method and apparatus embodiments, noise reduction occurs before demosaicing, which, as known, constructs the digital image from the digitized Bayer (or other color) pattern pixel signals received from the pixel array. In other method and apparatus embodiments, noise reduction occurs as part of the demosaicing process.

Figure 1:
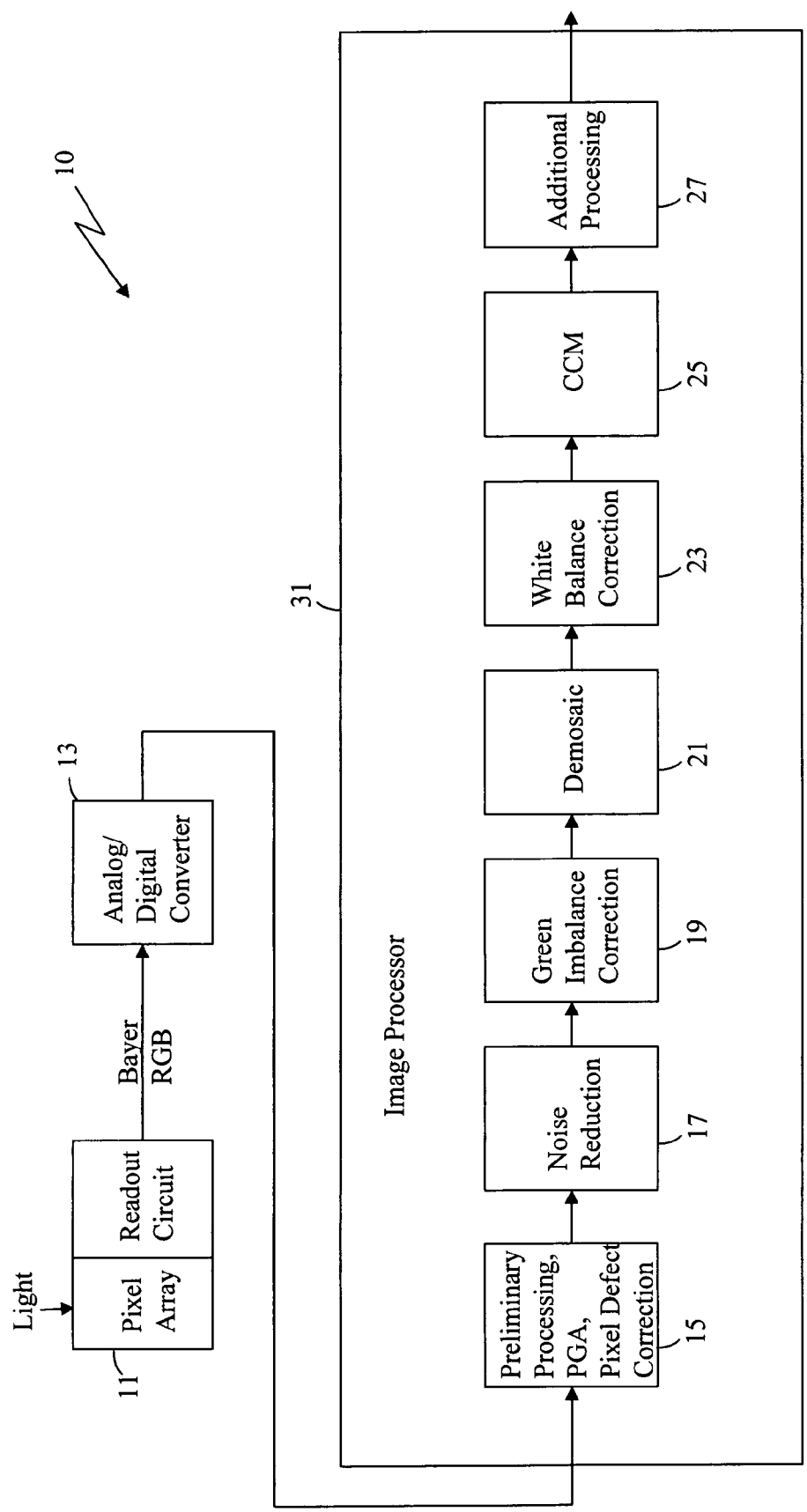
FIG. 1 is a block diagram of an imager according to an embodiment described herein.

Referring now to FIG. 1, first method and apparatus embodiments are now described. FIG. 1 shows an imager 10 having a pixel array and associated readout circuit 11 that sends a Bayer pattern RGB signal to an analog-to-digital converter 13. The analog-to-digital converter 13 sends digital signals to the image processor 31. Within the image processor 31, the signals are first processed by a preliminary processing portion 15 where preliminary processing is performed on the digital signals. Non-limiting examples of preliminary processing are positional gain adjustment and pixel defect correction.

Still referring to FIG. 1, the signals are then processed at a noise reduction portion 17, followed by a green imbalance correction portion 19, demosaicing portion 21, white balance correction portion 23, color correction matrix (CCM) portion 25 and an additional processing portion 27.

Figure 2:
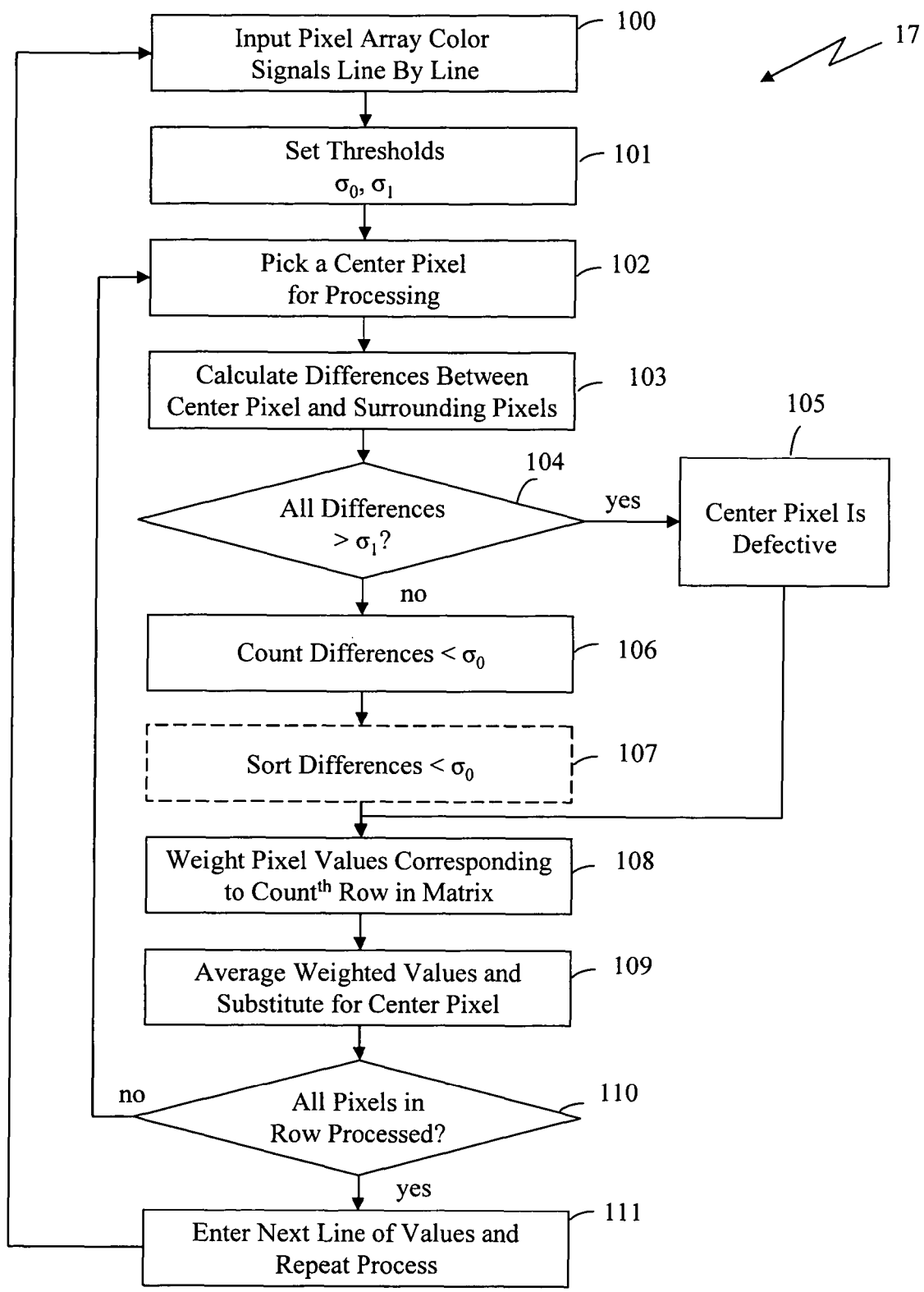
FIG. 2 is a flowchart illustrating a method of operating an imager according to an embodiment described herein.
Figure 3:
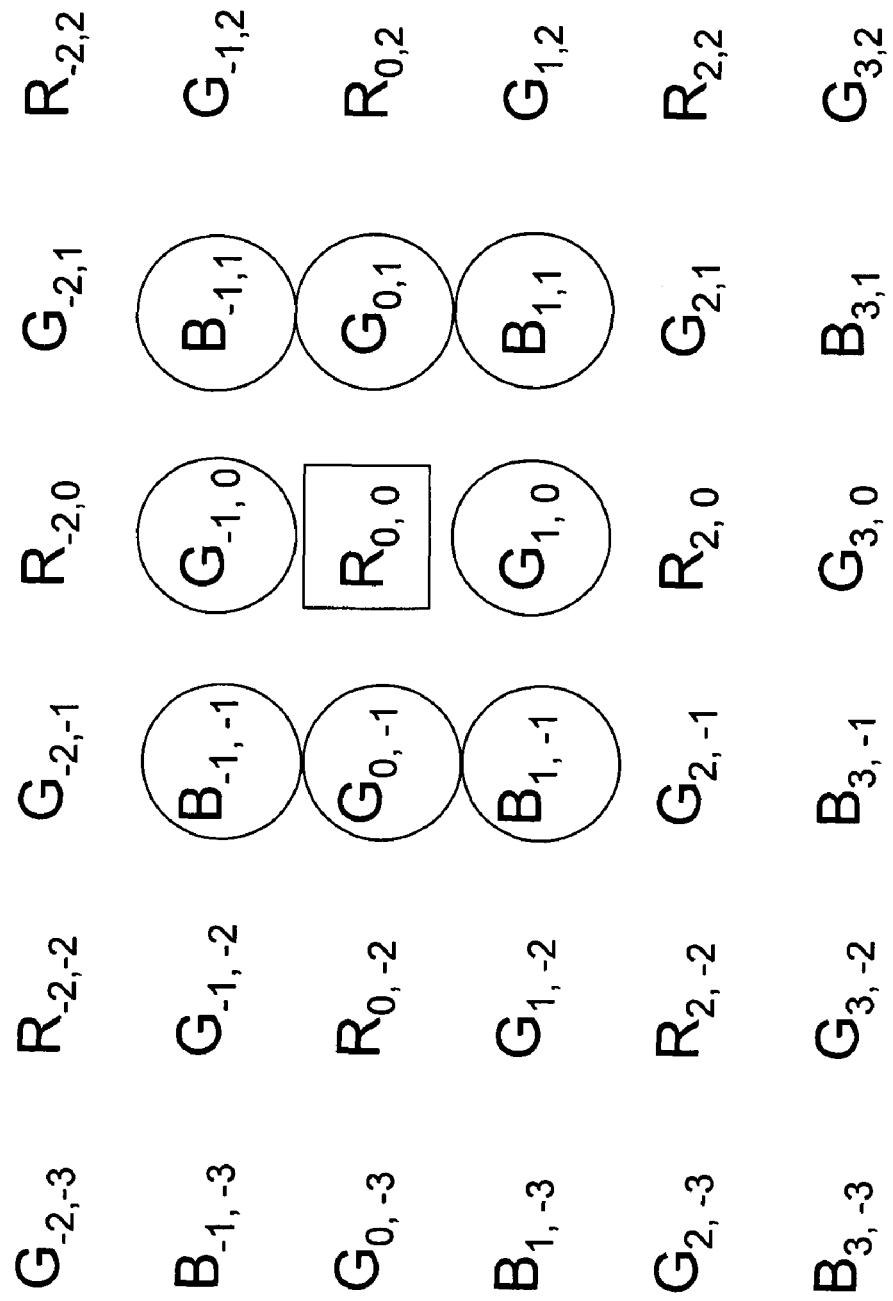
FIG. 3 illustrates pixel locations whose values are used for noise reduction.

FIG. 2 shows the steps occurring within the noise reduction portion 17. First, step 100 inputs pixel array color signals line by line. Then, step 101 sets two thresholds $\sigma 0$, $\sigma 1$. Threshold $\sigma 1$ is used to determine if the center pixel is defective and threshold $\sigma 0$ is used to determine whether the center pixel is on or near an edge. At step 102, a center pixel is chosen for processing. The center pixel may be any pixel in the pixel array, but is typically the next pixel in a row, or first pixel in the row if no other pixels in the current row have been processed. An example portion of a pixel array is shown in FIG. 3, where the chosen center pixel is red pixel $R_{0,0}$.

Referring back to FIG. 2, at step 103 the differences between the center pixel value and those at each surrounding pixel are calculated. In one embodiment, the surrounding pixels are the eight pixels that are in the 3×3 kernel surrounding the center pixel. It should be appreciated that the surrounding pixels may be more or less than the 3×3 kernel. In the example shown in FIG. 3, the eight surrounding pixels are $B_{-1,-1}$, $G_{-1,0}$, $B_{-1,1}$, $G_{0,1}$, $B_{1,1}$, $G_{1,0}$, $B_{1,-1}$, $G_{0,-1}$.

Referring back to FIG. 2, the next step is to determine whether all differences are greater than threshold $\sigma 1$ (step 104). If all differences are greater than threshold $\sigma 1$ at step 104, then at step 105 the center pixel is deemed defective and is handled according to a later step (i.e., step 108).

Referring again to step 104, if not all of the differences are greater than threshold $\sigma 1$, the next step is to count those differences that are less than threshold $\sigma 0$ (step 106). Step 106 is performed because only those neighboring pixels that are close in value to the center pixel (i.e., difference <$\sigma 0$) are used to determine a noise reduced value for the center pixel. Where a large difference exists between a surrounding pixel and the center pixel, an edge may exist, and thus, that surrounding pixel should not be used for noise reduction.

An optional step that sorts the differences that are less than threshold σ0 in ascending order is performed (step 107). By sorting the differences, those pixels closest in value to the center pixel (i.e., smallest difference) are given a greater weight in a later step.

At step 108 the pixel values are weighted according to the $k^{th}$ row in a weight matrix, where k is the number of differences counted (step 106) to be less than threshold σ0. To weight the pixel values, each surrounding pixel value is multiplied by an entry in the $k^{th}$ row of the weight matrix to create a weighted value for each surrounding pixel. The weight matrix has n+2 rows and n+1 columns where n is the number of surrounding pixels being used to process the center pixel. The total value of each row is n. The entries in each row are in descending order. Each successive row of the weight matrix has one more entry equal to zero than the row before it, with the exception of the last row. The first entry in each row is the weight for the center pixel, which is used to determine the noise reduced value of the center pixel. The last row in the weight matrix has a first entry equal to zero, the next four entries each equal to n/4 and the remaining entries equal to zero. When a defective pixel is found at step 105, the last row of the weight matrix is used to average the values of the four immediate surrounding pixels. FIG. 4 shows an example of a weight matrix that may be used when n is equal to 8, such as in the 3×3 kernel example of FIG. 3.

Referring again to FIG. 2, the next step is to average the weighted values and then substitute the average weighted value for the center pixel value (step 109). The average weighted value is computed as follows, where w is the weight entry from the $k^{th}$ row in the weight matrix and p is the value of the surrounding pixel:

$$AVG_{weighted} = \frac{1}{n}\sum_{i=0}^{n} w_i p_i$$

At step 110, it is determined whether all pixels in the row have been processed. If all pixels in the row have not been processed, the process continues at step 102 to pick another pixel to be the center pixel. If all pixels in the row have been processed, the next step is to input the next line of values (step 111) and repeat the process by returning to step 100.

Figure 5:
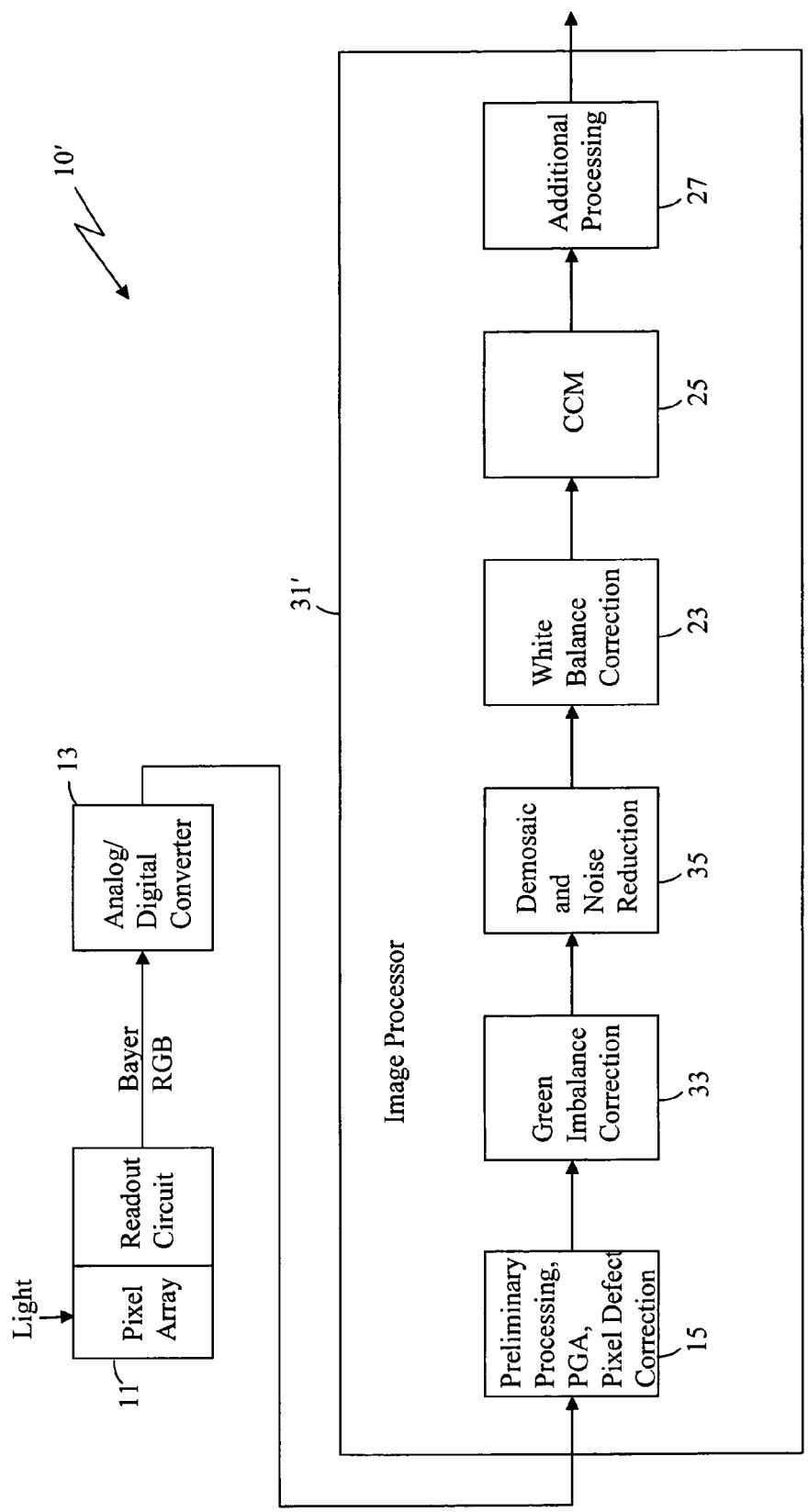
FIG. 5 is a block diagram of an imager according to an embodiment described herein.

Referring now to FIG. 5, other method and apparatus embodiments are now described. Imager 10' includes a different image processor 31' than the FIG. 2 embodiment. The method and apparatus described in FIG. 5 differ from the method and apparatus described in FIG. 2 in that the FIG. 5 image processor 31' has the demosaicing and noise reduction occurring concurrently in the Demosaic and Noise Reduction portion 35, while the FIG. 2 imager 10 did not.

Figure 6:
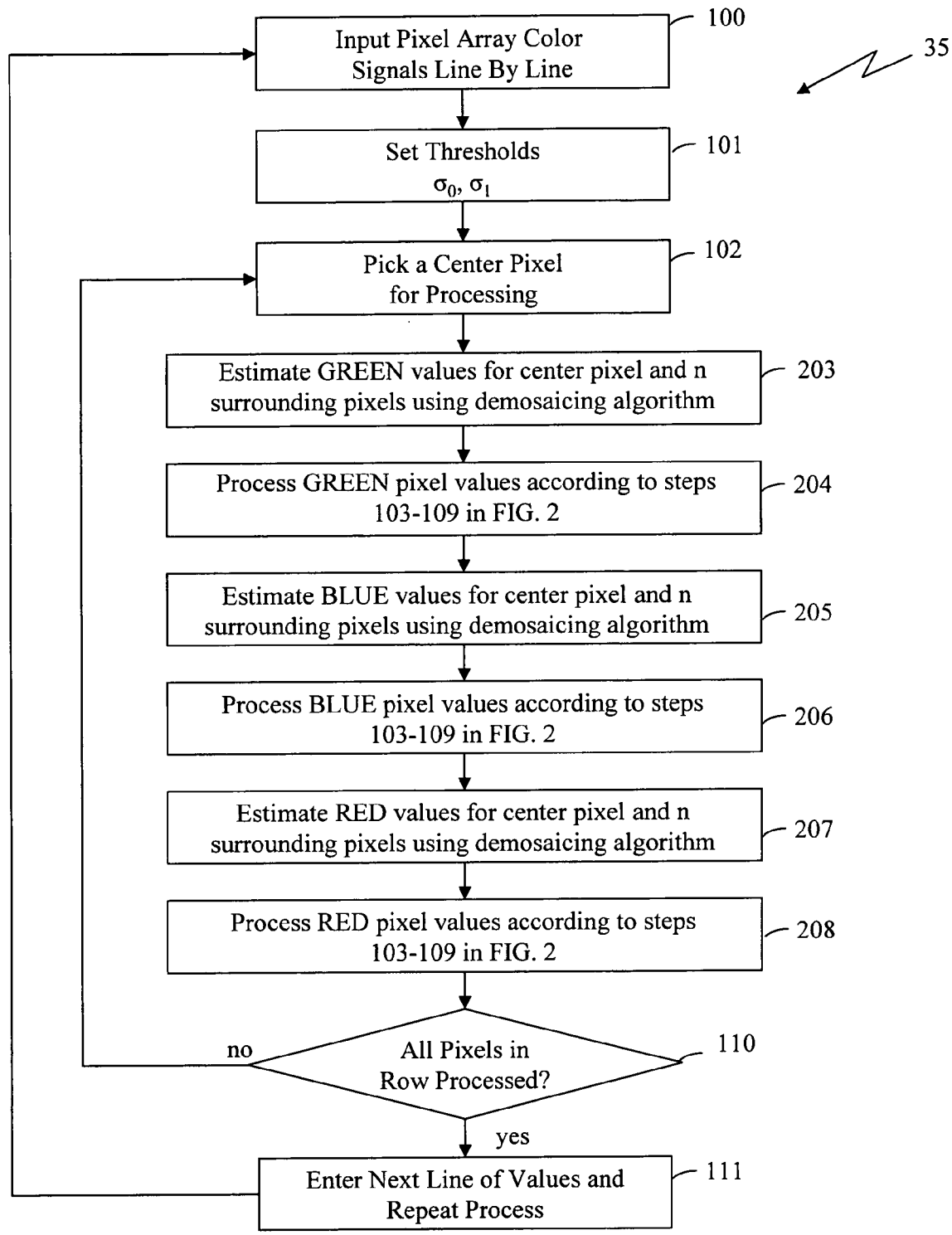
FIG. 6 is a flowchart illustrating a method of operating an imager according to an embodiment described herein.
Figure 7A:
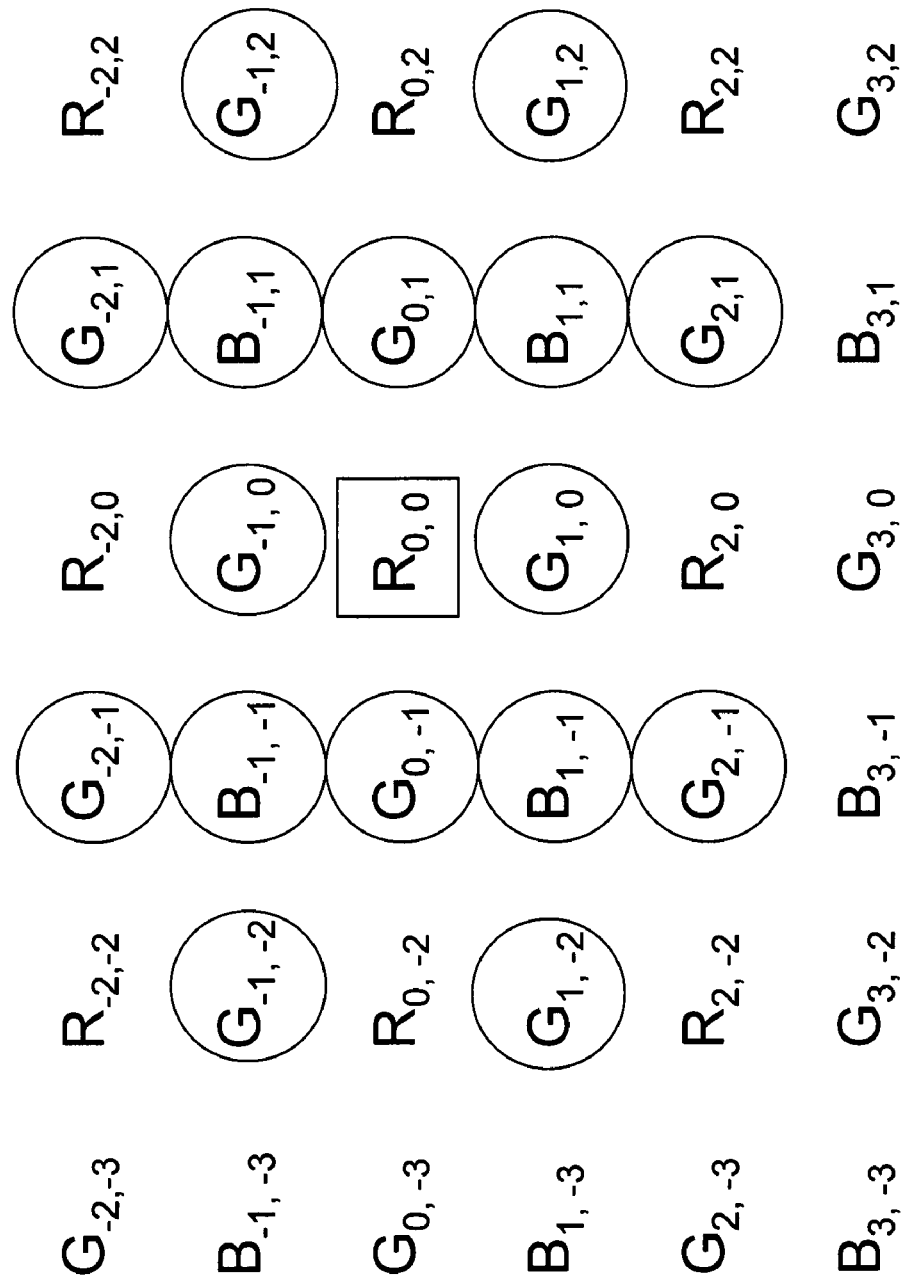
FIG. 7A illustrates pixel locations whose values are used for noise reduction.
Figure 7B:
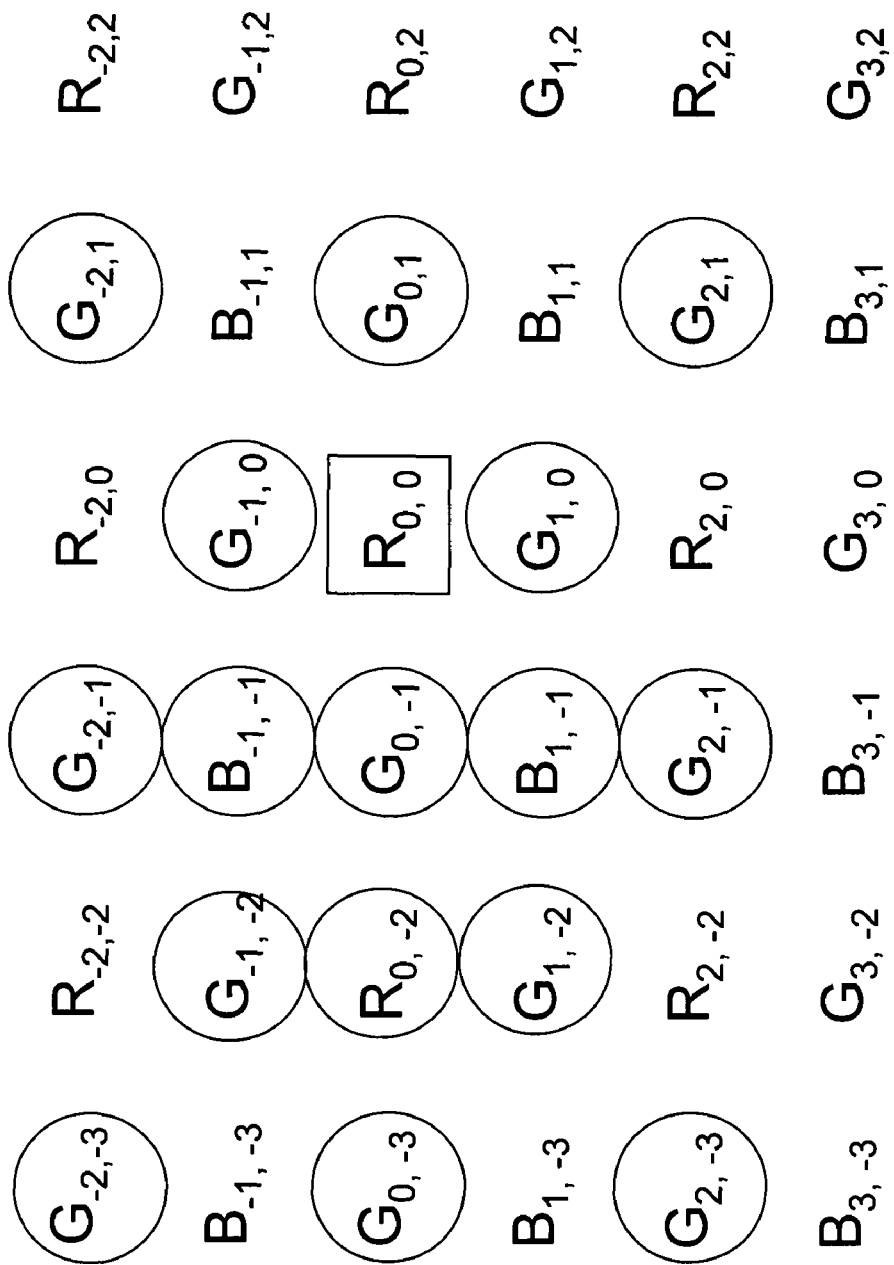
FIG. 7B illustrates pixel locations whose values are used for noise reduction.

FIG. 6 shows an embodiment of the steps occurring within the demosaicing and noise reduction portion 35 of FIG. 5. First, step 100 inputs pixel array color signals line by line. Then, step 101 sets two thresholds σ0, σ1. Threshold σ1 is used to determine if the center pixel is defective and threshold σ0 is used to determine whether the center pixel is on or near an edge. At step 102, a center pixel is chosen for processing. The center pixel may be any pixel in the pixel array, but is typically the next pixel in a row, or first pixel in the row if no other pixels in the current row have been processed. Example portions of pixel arrays are shown in FIGS. 7A, 7B, where the chosen center pixel is red pixel $R_{0,0}$.

Referring again to FIG. 6, at step 203 green values are estimated for the center pixel and n surrounding pixels using a demosaicing algorithm. In one example embodiment, shown in FIG. 3, the surrounding pixels are the eight pixels that are in the 3×3 kernel surrounding the center pixel. In other example embodiments, shown in FIGS. 7A and 7B, the surrounding pixels are the 16 circled pixels surrounding the center pixel $R_{0,0}$.

Referring again to FIG. 6, step 204 processes the n surrounding pixels according to steps 103-109 in FIG. 2 to calculate a noise reduced green value for the center pixel. One example of a weight matrix that may be used at step 108 (FIG. 2), where n is equal to 16 (such as in the examples shown in FIGS. 7A and 7B), is shown in FIG. 8.

Referring back to FIG. 6, at step 205, blue values are estimated for the center pixel and n surrounding pixels using a demosaicing algorithm. In one example embodiment, shown in FIG. 3, the surrounding pixels are the eight pixels that are in the 3×3 kernel surrounding the center pixel. In other example embodiments, shown in FIGS. 7A and 7B, the surrounding pixels are the 16 circled pixels surrounding the center pixel $R_{0,0}$.

Referring again to FIG. 6, step 206 processes the n surrounding pixels according to steps 103-109 in FIG. 2 to calculate a noise reduced blue value for the center pixel. One example of a weight matrix that may be used at step 108 (FIG. 2), where n is equal to 16 (such as in the examples shown in FIGS. 7A and 7B), is shown in FIG. 8.

Referring back to FIG. 6, at step 207, red values are estimated for the center pixel and n surrounding pixels using a demosaicing algorithm. In one example embodiment, shown in FIG. 3, the surrounding pixels are the eight pixels that are in the 3×3 kernel surrounding the center pixel. In other example embodiments, shown in FIGS. 7A and 7B, the surrounding pixels are the 16 circled pixels surrounding the center pixel $R_{0,0}$.

Referring again to FIG. 6, step 208 processes the n surrounding pixels according to steps 103-109 in FIG. 2 to calculate a noise reduced red value for the center pixel. One example of a weight matrix that may be used at step 108 (FIG. 2), where n is equal to 16 (such as in the examples shown in FIGS. 7A and 7B), is shown in FIG. 8.

One example of a demosaicing algorithm that may be used in steps 203, 205, and 207 is described in U.S. patent application Ser. No. 11/873,123, entitled Method and Apparatus for Anisotropic Demosaicing of Image Data. While steps 203-208 show green processed first, blue processed next, and red processed last, the colors can be processed in any order. In addition, the number of surrounding pixels n may be different at each step 203, 205, 207.

At step 110, it is determined whether all pixels in the row have been processed. If all pixels in the row have not been processed, the process continues at step 102 to pick another pixel to be the center pixel. If all pixels in the row have been processed, the next step is to input the next line of values (step 111) and repeat the FIG. 6 process by returning to step 100.

Figure 9:
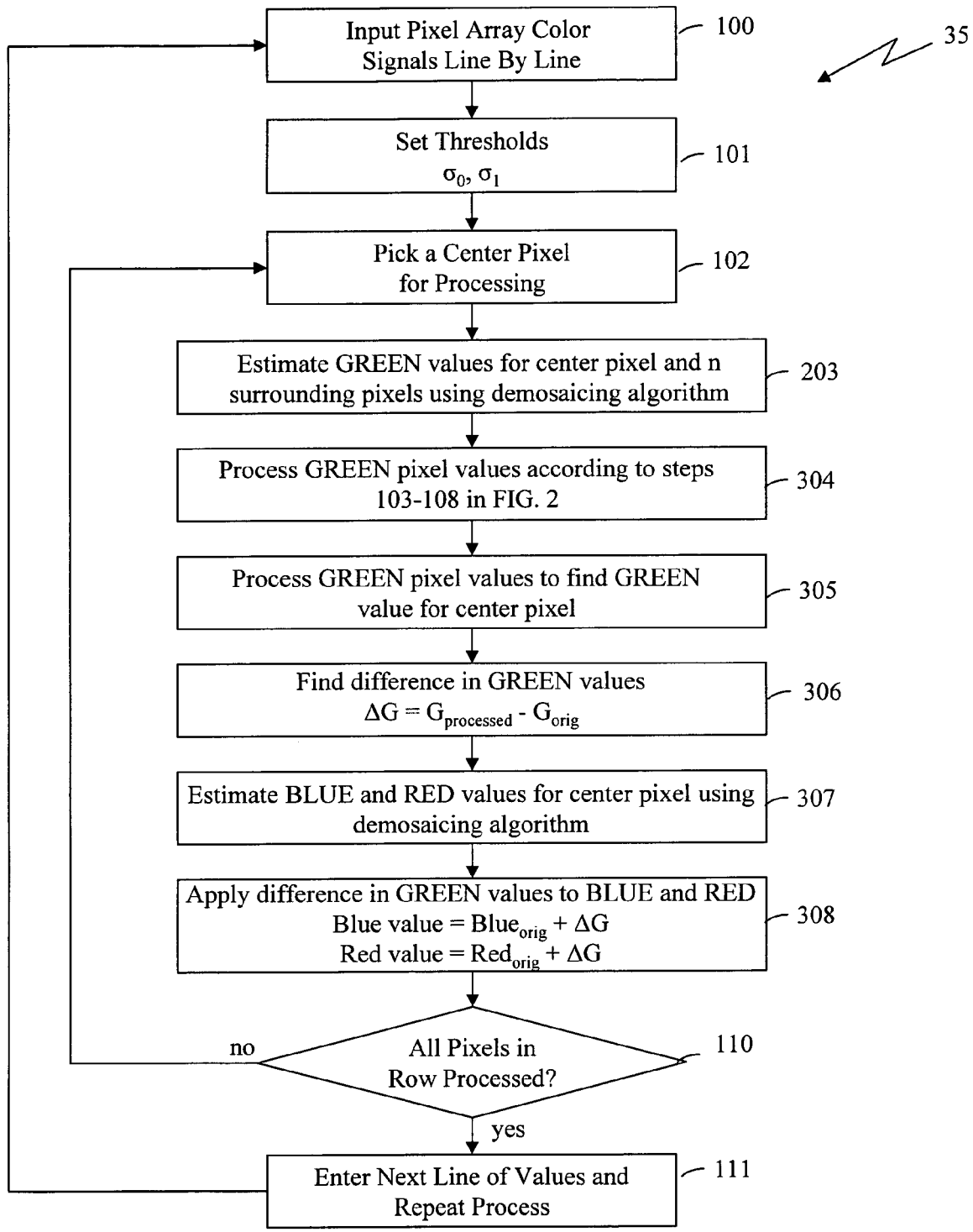
FIG. 9 is a flowchart illustrating a method of operating an imager according to an embodiment described herein.

FIG. 9 shows another embodiment of the steps occurring during the demosaicing and noise reduction portion 35 of FIG. 5. The embodiment illustrated in FIG. 9 improves upon the FIG. 6 embodiment because blue and red values are not estimated for n surrounding pixels using a demosaicing algorithm, but are instead determined using the difference between the demosaiced green center pixel value and the noise reduced green center pixel value.

Figure 10A:
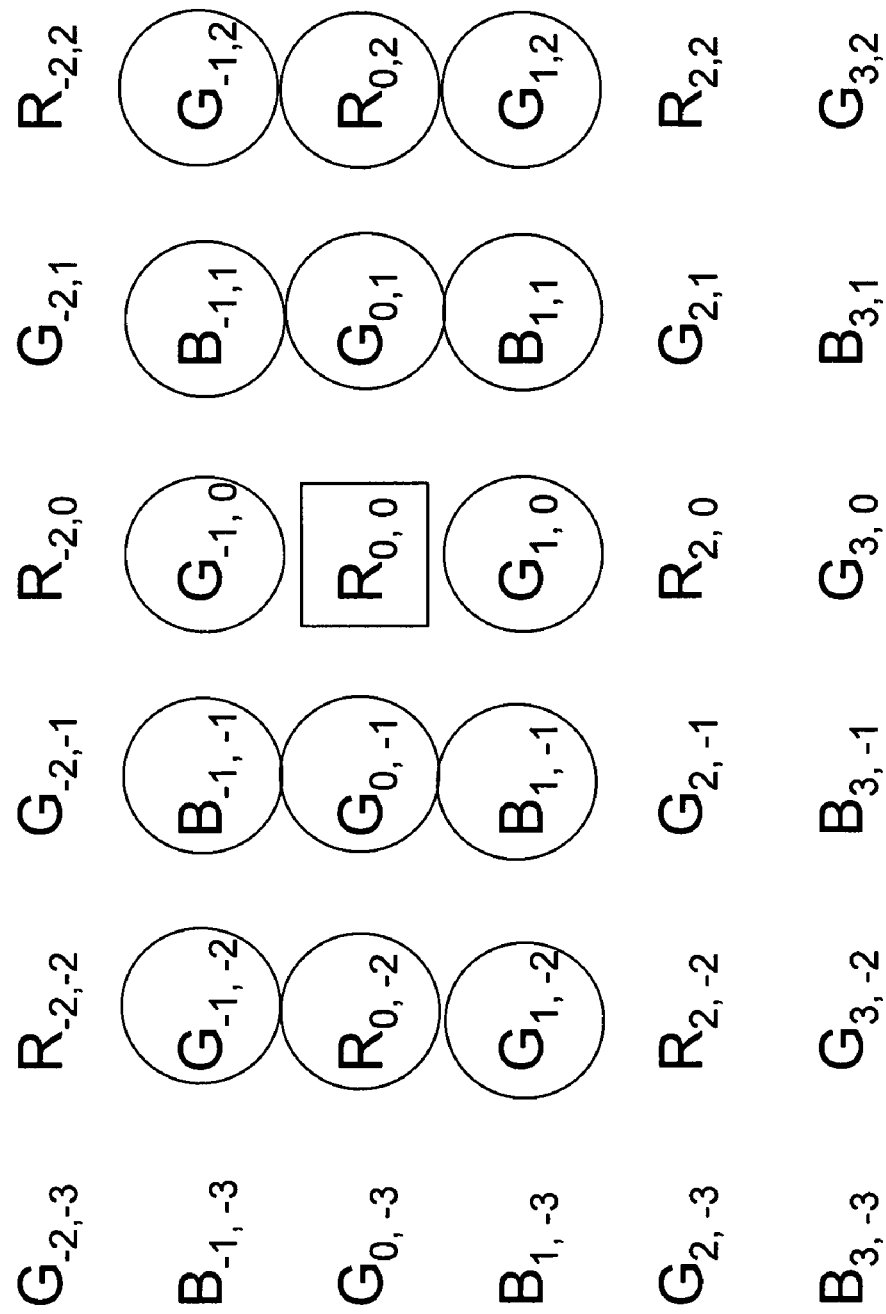
FIG. 10A illustrates pixel locations whose values are used for noise reduction.
Figure 10B:
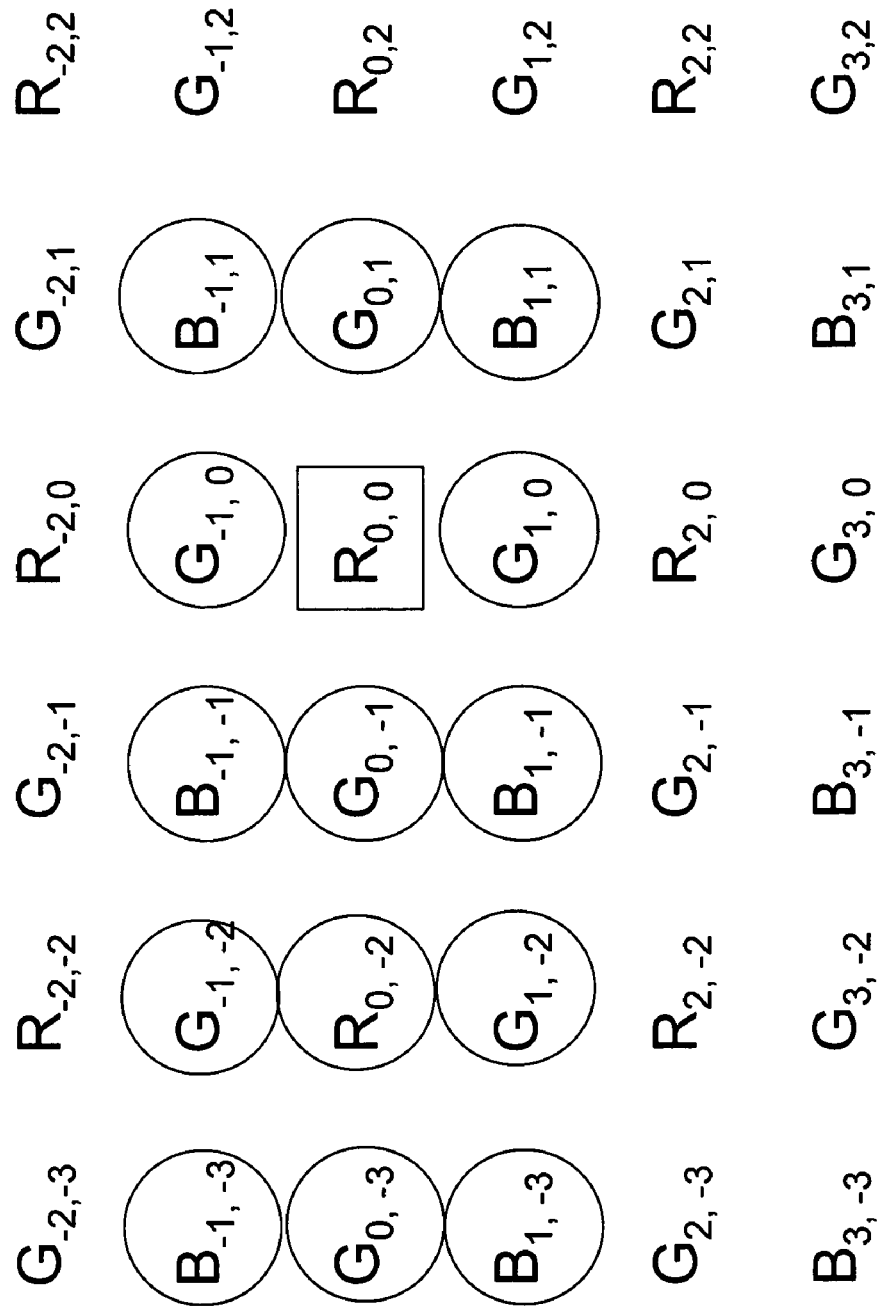
FIG. 10B illustrates pixel locations whose values are used for noise reduction.

Referring now to FIG. 9, first, step 100 inputs pixel array color signals line by line. Then, step 101 sets two thresholds σ0, σ1. Threshold σ1 is used to determine if the center pixel is defective and threshold σ0 is used to determine whether the center pixel is on or near an edge. At step 102, a center pixel is chosen for processing. The center pixel may be any pixel in the pixel array, but is typically the next pixel in a row, or first pixel in the row if no other pixels in the current row have been processed. Example portions of pixel arrays are shown in FIGS. 10A and 10B, where the chosen center pixel is red pixel $R_{0,0}$.

Referring again to FIG. 9, step 203 estimates green values for the center pixel and n surrounding pixels using a demosaicing algorithm. In one example embodiment, shown in FIG. 3, the surrounding pixels are the eight pixels that are in the 3×3 kernel surrounding the center pixel. In other example embodiments, shown in FIGS. 7A and 7B, the surrounding pixels are the 16 circled pixels surrounding the center pixel $R_{0,0}$. In yet other example embodiments, shown in FIGS. 10A and 10B, the surrounding pixels are the 14 circled pixels in the 3×5 kernel surrounding the center pixel $R_{0,0}$. One example of a demosaicing algorithm that may be used is described in U.S. patent application Ser. No. 11/873,123, entitled Method and Apparatus for Anisotropic Demosaicing of Image Data.

Referring again to FIG. 9, step 304 processes the n surrounding pixels according to steps 103-108 (FIG. 2) to find weighted values for each of the surrounding pixels and the center pixel. Examples of weight matrices that may be used at step 108 (FIG. 2) are shown in FIGS. 4 and 8, where n is equal to 8 and 16, respectively.

Referring again to FIG. 9, step 305 calculates a green value for the center pixel using the following, where w is the weight entry from the $k^{th}$ row in the weight matrix and p is the value of the surrounding pixel:

$$G_{center} = \frac{1}{\sum_{i=0}^{n-1} w_i} \sum_{i=0}^{n-1} w_i p_i$$

Step 306 calculates the difference ΔG between the center pixel's green value after demosaicing at step 203 $G_{203}$ and the center pixel's green value after noise reduction at step 305 $G_{305}$ by using the following:

$$\Delta G = G_{305} - G_{203}$$

The next step estimates blue and red values $B_{est}$, $R_{est}$ for the center pixel using a demosaicing algorithm (step 307). One example of a demosaicing algorithm that may be used is described in U.S. patent application Ser. No. 11/873,123, entitled Method and Apparatus for Anisotropic Demosaicing of Image Data. The next step 308 applies the difference ΔG to the blue and red values of the center pixel using the following:

$$B_{center} = B_{est} + \Delta G$$

$$R_{Center} = R_{est} + \Delta G$$

At step 110, it is determined whether all pixels in the row have been processed. If all pixels in the row have not been processed, the process continues at step 102 to pick another pixel to be the center pixel. If all pixels in the row have been processed, the next step is to input the next line of values (step 111) and repeat the FIG. 9 process by returning to step 100.

Figure 11:
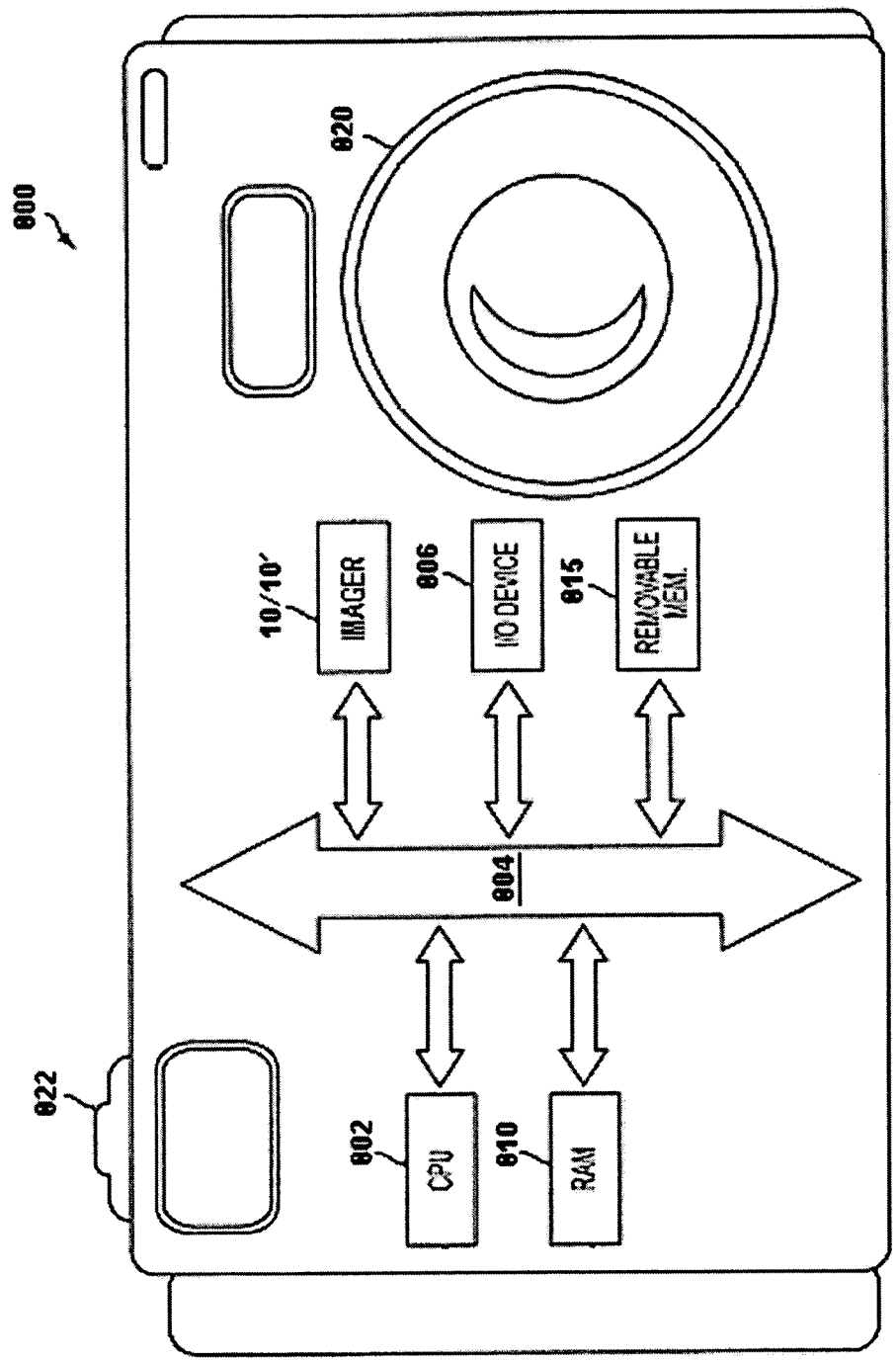
FIG. 11 is a block diagram of a processor system according to an embodiment described herein.

FIG. 11 shows a typical system 800 modified to include an imager 10/10' constructed and operated in accordance with an embodiment described in FIGS. 1-10. The system 800 includes digital circuits that could include imagers. Without being limiting, such a system could include a computer system, camera system, scanner, machine vision, vehicle navigation, video phone, surveillance system, auto focus system, star tracker system, motion detection system, image stabilization system, or other image acquisition system.

System 800, for example a digital still or video camera system, generally comprises a central processing unit (CPU) 802, such as a control circuit or microprocessor for conducting camera functions, that communicates with one or more input/output (I/O) devices 806 over a bus 804. Imager 10/10' also communicates with the CPU 802 over the bus 804. The system 800 also includes random access memory (RAM) 810, and can include removable memory 815, such as flash memory, which also communicates with the CPU 802 over the bus 804. The imager 10/10' may be combined with the CPU processor with or without memory storage on a single integrated circuit or on a different chip than the CPU processor. In a camera system, a lens 820 is used to focus light onto the pixel array 11 of the imager 10/10' when a shutter release button 822 is pressed.

The above description and drawings are only to be considered illustrative of specific embodiments, which achieve the features and advantages described herein. Modification and substitutions to specific structures can be made. Accordingly, the claimed invention is not to be considered as being limited by the foregoing description and drawings, but is only limited by the scope of the appended claims.

What is claimed as new and desired to be protected by Letters Patent of the United States is:

1. A method of processing a digital image, said method comprising:
   capturing an image from a Bayer patterned pixel array;
   providing digital Bayer pattern pixel signals corresponding to the pixels of said array;
   demosaicing said digital Bayer pattern pixel signals to produce said digital image;
   removing noise from said digital Bayer pattern pixel signals prior to or as part of said demosaicing by using a weight matrix, wherein said step of removing noise further comprises:
      calculating a plurality of differences between a center pixel being processed and a plurality of surrounding pixels;
      counting each of the plurality of differences whose value is less than a first threshold to obtain a count; and
      processing the center pixel based on weighted values for the center pixel and the plurality of surrounding pixels obtained from the weight matrix, wherein the weighted values are determined by using a row of the weight matrix corresponding to the count, and wherein the weight matrix comprises:

$$\begin{bmatrix} 1 & 1 & 1 & 1 & 1 & 1 & 1 & 1/2 & 1/2 \\ 1 & 1 & 1 & 1 & 1 & 1 & 1 & 1 & 0 \\ 2 & 1 & 1 & 1 & 1 & 1 & 1 & 0 & 0 \\ 2 & 2 & 1 & 1 & 1 & 1 & 0 & 0 & 0 \\ 2 & 2 & 2 & 1 & 1 & 0 & 0 & 0 & 0 \\ 2 & 2 & 2 & 2 & 0 & 0 & 0 & 0 & 0 \\ 4 & 2 & 2 & 0 & 0 & 0 & 0 & 0 & 0 \\ 4 & 4 & 0 & 0 & 0 & 0 & 0 & 0 & 0 \\ 8 & 0 & 0 & 0 & 0 & 0 & 0 & 0 & 0 \\ 0 & 2 & 2 & 2 & 2 & 0 & 0 & 0 & 0 \end{bmatrix}.$$

2. A method of processing a digital image, said method comprising:
- capturing an image from a Bayer patterned pixel array;
- providing digital Bayer pattern pixel signals corresponding to the pixels of said array;
- demosaicing said digital Bayer pattern pixel signals to produce said digital image;
- removing noise from said digital Bayer pattern pixel signals prior to or as part of said demosaicing by using a weight matrix, wherein said step of removing noise further comprises:
  - calculating a plurality of differences between a center pixel being processed and a plurality of surrounding pixels;
  - counting each of the plurality of differences whose value is less than a first threshold to obtain a count; and
  - processing the center pixel based on weighted values for the center pixel and the plurality of surrounding pixels obtained from the weight matrix, wherein the weighted values are determined by using a row of the weight matrix corresponding to the count, and wherein the weight matrix comprises:

$$\begin{bmatrix}
1 & 1 & 1 & 1 & 1 & 1 & 1 & 1 & 1 & 1 & 1 & 1 & 1 & 1 & 1 & 0 \\
1 & 1 & 1 & 1 & 1 & 1 & 1 & 1 & 1 & 1 & 1 & 1 & 1 & 1 & 1 & 0 \\
2 & 1 & 1 & 1 & 1 & 1 & 1 & 1 & 1 & 1 & 1 & 1 & 1 & 1 & 0 & 0 \\
2 & 2 & 1 & 1 & 1 & 1 & 1 & 1 & 1 & 1 & 1 & 1 & 1 & 0 & 0 & 0 \\
2 & 2 & 2 & 1 & 1 & 1 & 1 & 1 & 1 & 1 & 1 & 1 & 0 & 0 & 0 & 0 \\
2 & 2 & 2 & 2 & 1 & 1 & 1 & 1 & 1 & 1 & 1 & 0 & 0 & 0 & 0 & 0 \\
2 & 2 & 2 & 2 & 2 & 1 & 1 & 1 & 1 & 1 & 0 & 0 & 0 & 0 & 0 & 0 \\
2 & 2 & 2 & 2 & 2 & 2 & 1 & 1 & 1 & 1 & 0 & 0 & 0 & 0 & 0 & 0 \\
2 & 2 & 2 & 2 & 2 & 2 & 1 & 1 & 0 & 0 & 0 & 0 & 0 & 0 & 0 & 0 \\
2 & 2 & 2 & 2 & 2 & 2 & 2 & 0 & 0 & 0 & 0 & 0 & 0 & 0 & 0 & 0 \\
4 & 2 & 2 & 2 & 2 & 2 & 2 & 0 & 0 & 0 & 0 & 0 & 0 & 0 & 0 & 0 \\
4 & 4 & 2 & 2 & 2 & 2 & 0 & 0 & 0 & 0 & 0 & 0 & 0 & 0 & 0 & 0 \\
4 & 4 & 4 & 2 & 2 & 0 & 0 & 0 & 0 & 0 & 0 & 0 & 0 & 0 & 0 & 0 \\
4 & 4 & 4 & 4 & 0 & 0 & 0 & 0 & 0 & 0 & 0 & 0 & 0 & 0 & 0 & 0 \\
8 & 4 & 4 & 0 & 0 & 0 & 0 & 0 & 0 & 0 & 0 & 0 & 0 & 0 & 0 & 0 \\
8 & 8 & 0 & 0 & 0 & 0 & 0 & 0 & 0 & 0 & 0 & 0 & 0 & 0 & 0 & 0 \\
16 & 0 & 0 & 0 & 0 & 0 & 0 & 0 & 0 & 0 & 0 & 0 & 0 & 0 & 0 & 0 \\
0 & 4 & 4 & 4 & 4 & 0 & 0 & 0 & 0 & 0 & 0 & 0 & 0 & 0 & 0 & 0
\end{bmatrix}.$$

3. An apparatus for processing a digital image, said apparatus comprising:
- a digital image processor configured to perform the steps of:
  - capturing an image from a Bayer patterned pixel array;
  - providing digital Bayer pattern pixel signals corresponding to the pixels of said array; and
  - demosaicing or processing said digital Bayer pattern pixel signals with a weight matrix to both remove noise and demosaic the signals, wherein said step of removing noise further comprises:
    - calculating a plurality of differences between a center pixel being processed and a plurality of surrounding pixels;
    - counting each of the plurality of differences whose value is less than a first threshold to obtain a count; and
    - processing the center pixel based on weighted values for the center pixel and the plurality of surrounding pixels, said weighted values determined by using a row of the weight matrix corresponding to the count, the matrix having rows and columns, and each row having a plurality of entries, wherein the number of rows in the weight matrix is two more than the number of surrounding pixels, the number of columns in the weight matrix is one more than the number of surrounding pixels, the total value of each row of the weight matrix is the number of surrounding pixels, the entries in each row of the weight matrix are in descending order, at least one row of the weight matrix comprises a number of zeroes that is one more than the number of zeroes in the previous row, and wherein the last row in the weight matrix comprises:
      - a first entry equal to 0;
      - a second, third, fourth and fifth entry each equal to the number of surrounding pixels divided by 4; and
      - a sixth through a last entry equal to zero.

\* \* \* \* \*